(12) United States Patent
Gordner et al.

(10) Patent No.: US 9,881,102 B2
(45) Date of Patent: Jan. 30, 2018

(54) AGGREGATING PERSONALIZED SUGGESTIONS FROM MULTIPLE SOURCES

(71) Applicant: Microsoft Corporation, Redmond, WA (US)

(72) Inventors: Jon Gordner, Seattle, WA (US); Max Morris, Seattle, WA (US); Alexander Hills, Seattle, WA (US); Xiao Wei, Sammamish, WA (US); Gaurav Anand, Seattle, WA (US); Elbio Abib, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 13/868,063

(22) Filed: Apr. 22, 2013

(65) Prior Publication Data
US 2014/0317072 A1 Oct. 23, 2014

(51) Int. Cl.
*G06F 7/00* (2006.01)
*G06F 17/30* (2006.01)

(52) U.S. Cl.
CPC ...... *G06F 17/3097* (2013.01); *G06F 17/3064* (2013.01); *G06F 17/30864* (2013.01)

(58) Field of Classification Search
CPC ......... G06F 17/30554; G06F 17/30557; G06F 17/30976; G06F 17/3097; G06F 17/3064; G06F 17/30867; G06F 17/30696; G06Q 30/0275
USPC ............... 707/767, 768–771, 805, 722–732; 709/225, 229, 241
See application file for complete search history.

(56) References Cited

U.S. PATENT DOCUMENTS

| | | | | |
|---|---|---|---|---|
| 7,287,041 B2* | 10/2007 | Barnes-Leon | .... | G06F 17/30569 |
| 7,606,764 B1* | 10/2009 | Mancini | ................. | G06Q 20/10 705/17 |
| 7,949,589 B2* | 5/2011 | Halpin | .................... | G06Q 40/00 705/36 R |
| 8,204,897 B1* | 6/2012 | Djabarov | .......... | G06F 17/30705 707/767 |
| 8,341,143 B1* | 12/2012 | Karls | ................ | G06F 17/30991 707/708 |
| 8,341,146 B1 | 12/2012 | Bleckner et al. | | |
| 8,462,392 B2* | 6/2013 | Loeb | .................... | C12Q 1/6827 358/403 |
| 8,560,562 B2* | 10/2013 | Kanefsky | ............ | G06F 17/3064 707/767 |

(Continued)

OTHER PUBLICATIONS

Pillai, Jitesh., "Google Maps Unveiled Personalized Suggestions", Retrieved at <<http://news.ebrandz.com/google/2010/3103-google-maps-unveiled-personalized-suggestions.html>>, May 24, 2012, pp. 2.

(Continued)

*Primary Examiner* — Daniel Kuddus
(74) *Attorney, Agent, or Firm* — Patent GC LLC

(57) ABSTRACT

A computer provides a search interface that accesses multiple search providers, and aggregates their suggestions, providing a single, unified suggestion view across the multiple search providers. Suggestions are received from the multiple sources, such as a search engine on the internet or other public resource, and a search tool on the computer that accesses local or private resources. The suggestions are combined, ranked and displayed as a list to the user, from which the user is able to select.

16 Claims, 7 Drawing Sheets

(56) References Cited

U.S. PATENT DOCUMENTS

| | | | | |
|---|---|---|---|---|
| 8,762,392 | B1* | 6/2014 | Yamauchi | G06F 17/3064 707/749 |
| 8,983,996 | B2* | 3/2015 | Lai | G06F 17/30867 707/767 |
| 9,336,285 | B2* | 5/2016 | Vidra | G06F 17/30554 |
| 2002/0023017 | A1* | 2/2002 | Hidaka | G06Q 30/02 705/26.8 |
| 2002/0065676 | A1* | 5/2002 | Grainger | G06Q 10/10 705/310 |
| 2003/0046307 | A1* | 3/2003 | Rivette | G06F 17/30011 |
| 2003/0163492 | A1* | 8/2003 | Slifer | 707/204 |
| 2003/0163942 | A1* | 9/2003 | Herzog | F41A 17/066 42/70.07 |
| 2003/0177032 | A1* | 9/2003 | Bonissone | G06F 17/243 705/2 |
| 2004/0199489 | A1* | 10/2004 | Barnes-Leon | G06F 17/30569 |
| 2006/0064411 | A1* | 3/2006 | Gross | G06F 17/30864 |
| 2006/0190449 | A1* | 8/2006 | Lundberg | G06F 17/30864 |
| 2008/0222132 | A1* | 9/2008 | Pan | G06F 17/30867 |
| 2009/0019002 | A1* | 1/2009 | Boulis | G06F 17/3064 |
| 2009/0150409 | A1* | 6/2009 | Watson | H04N 5/76 |
| 2009/0222437 | A1* | 9/2009 | Niu | G06F 17/30864 |
| 2010/0114587 | A1* | 5/2010 | Masuyama | G06Q 50/18 705/1.1 |
| 2012/0023120 | A1* | 1/2012 | Kanefsky | G06F 17/3064 707/767 |
| 2012/0124071 | A1* | 5/2012 | Gebhard | G06F 17/3097 707/767 |
| 2012/0296743 | A1* | 11/2012 | Velipasaoglu | G06Q 30/0251 705/14.54 |
| 2013/0132154 | A1* | 5/2013 | Mayburd | G06Q 30/0202 705/7.31 |
| 2013/0232135 | A1* | 9/2013 | Vidra | G06F 17/30554 707/722 |
| 2013/0232167 | A1* | 9/2013 | Vidra | G06Q 30/0251 707/769 |
| 2014/0280107 | A1* | 9/2014 | Heymans | G06F 17/3064 707/727 |
| 2016/0224661 | A1* | 8/2016 | Vidra | G06F 17/30554 |

OTHER PUBLICATIONS

Sontag, et al., "Probabilistic Models for Personalizing Web Search", Retrieved at <<http://research.microsoft.com/en-us/um/people/sdumais/WSDM2012-wsdm008-sontag.pdf>>, Fifth ACM International Conference on Web Search and Data Mining, Feb. 8, 2012, pp. 10.

Park, et al., "User Intention based Personalized Search : HPS(Hierarchical Phrase Serch)", Retrieved at <<http://www.wseas.us/e-library/transactions/circuits/2008/27-178.pdf>>, WSEAS Transactions on Circuits and Systems, Apr. 2008, pp. 11.

Slawski, Bill., "Reranking Search Results Based Upon Personalization and Diversification", Retrieved at <<http://www.seobythesea.com/2007/12/reranking-search-results-based-upon-personalization-and-diversification/>>, Sep. 20, 2011, pp. 4.

Giannopoulos, et al., "Learning to Rank User Intent", Retrieved at <<http://www.kma.informatik.tu-darmstadt.de/fileadmin/user_upload/Group_KMA/kma_publications/sp0771-giannopoulosPS2.pdf>>, International Conference on Information and Knowledge Management, Oct. 24, 2011, pp. 6.

"International Preliminary Report on Patentability Issued in PCT Patent Application No. PCT/US2013/058667", dated Jul. 3, 2015, 9 Pages.

"International Search Report & Written Opinion for PCT Patent Application No. PCT/US2013/058667", dated Jun. 11, 2014, Filed Date: Sep. 9, 2013, 9 Pages.

\* cited by examiner

AGGREGATING PERSONALIZED SUGGESTIONS FROM MULTIPLE SOURCES

BACKGROUND

Many user interfaces for text-based search providers on a computer or on the internet provide one or more suggestions to a user while the user is entering a query for a search. Such suggestions typically are words or phrases that match and/or complete a string of characters that the user has entered. As the user enters more characters, the suggestions change to continue matching or completing the string already entered. A user can stop entering characters and select one of the suggested words or phrases as the query.

A search provider typically derives suggestions from history data and potential search results for the query as currently entered. For example, if a user's computer indexes files, then a search tool on that computer may provide suggestions based on files that match the query as entered. The search tool also may provide suggestions based on prior queries performed by the user using the search tool. Similarly, a search engine on the internet may provide suggestions based on resources, such as web pages, that match the query as entered. The search engine also may provide suggestions based on prior queries of that user and/or other users using the search tool. In general, each search provider provides suggestions based on the history or indexed data associated with that search provider.

SUMMARY

This Summary introduces selected concepts in simplified form that are further described below in the Detailed Description. This Summary is intended neither to identify key or essential features of the claimed subject matter, nor to limit the scope of the claimed subject matter.

A computer provides a search interface that accesses multiple search providers, and aggregates their suggestions, providing a single, unified suggestion view across the multiple search providers. Suggestions are received from the multiple sources, such as a search engine on the internet or other public resource, and a search tool on the computer that accesses local or private resources. The suggestions are combined, ranked and displayed as a list to the user, from which the user is able to select.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which aggregated suggestions from multiple sources can be implemented.

Figure 1:
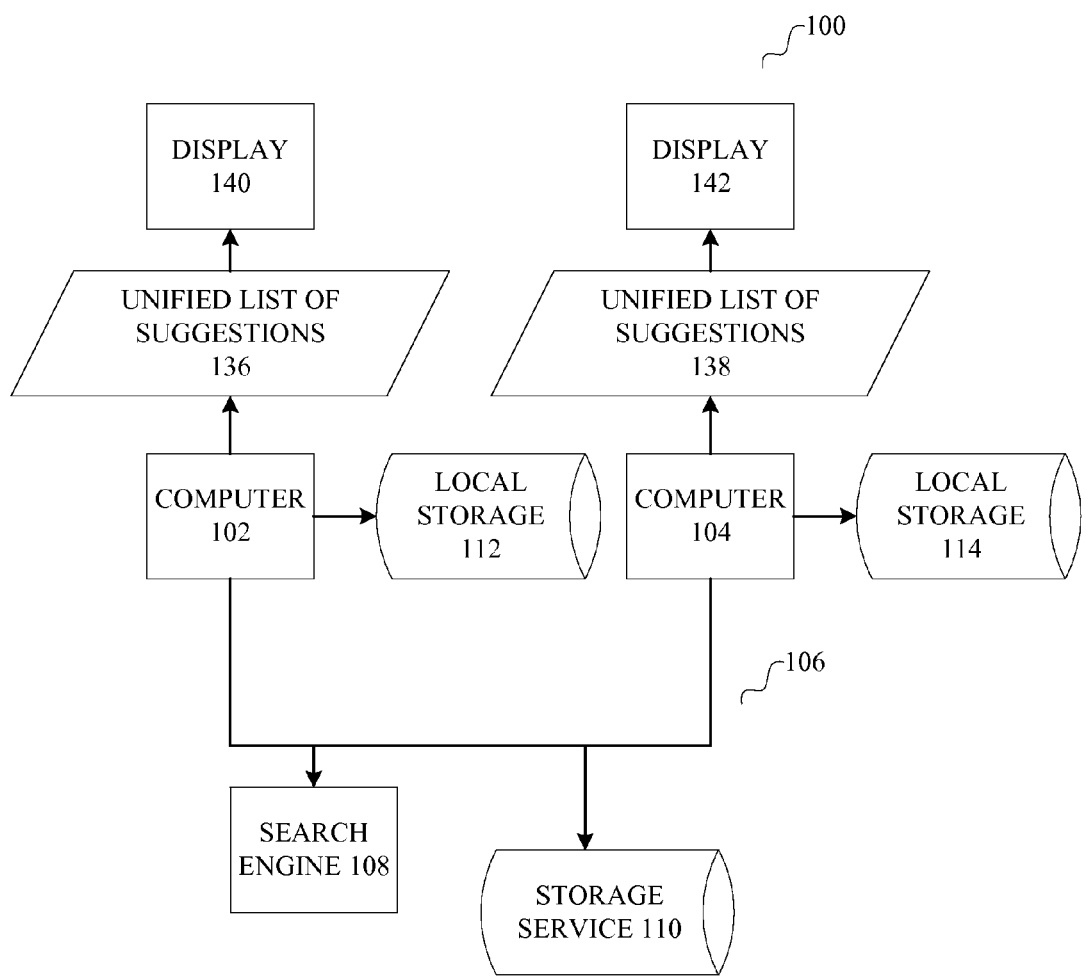
FIG. 1 is a block diagram of an example system showing multiple users accessing multiple search providers providing suggestions.

Referring to FIG. 1, a system 100 includes a first computer 102 and a second computer 104. The computers 102, 104 are connected through a computer network 106 to one or more other computers, such as a website that provides a search engine 108. The first and second computers also may connect to computers that provide a storage service 110, which provides remote storage of data files. First and second computers also typically have local storage 112, 114 on which data files are stored through a file system of an operating system of the computers 102, 104. A typical computer configuration is described in more detail below in connection with FIG. 7.

In such a configuration, a user of a computer 102 (or 104) can search for information in data files in local storage 112, the storage service 110 or on the search engine 108. Accessing each of these resources generally involves a different search provider—a search tool on the local computer for the local storage, a search interface for the storage service, and a search interface for the search engine. As shown in FIG. 1, if these search providers provide suggestions, an initial query is sent to the search provider used by the user, which responds with one or more suggestions.

A search interface (not shown) in the computers receives user input to provide an initial query and provide the initial query to the search providers. The search interface receives the suggestions from the search providers, and combines them into a single, unified list 136, 138 of suggestions which is displayed on a display 140, 142 for the user. The user can select from among these suggestions.

Given this context, an example implementation will be described in more detail in connection with FIGS. 2-6.

Figure 2:
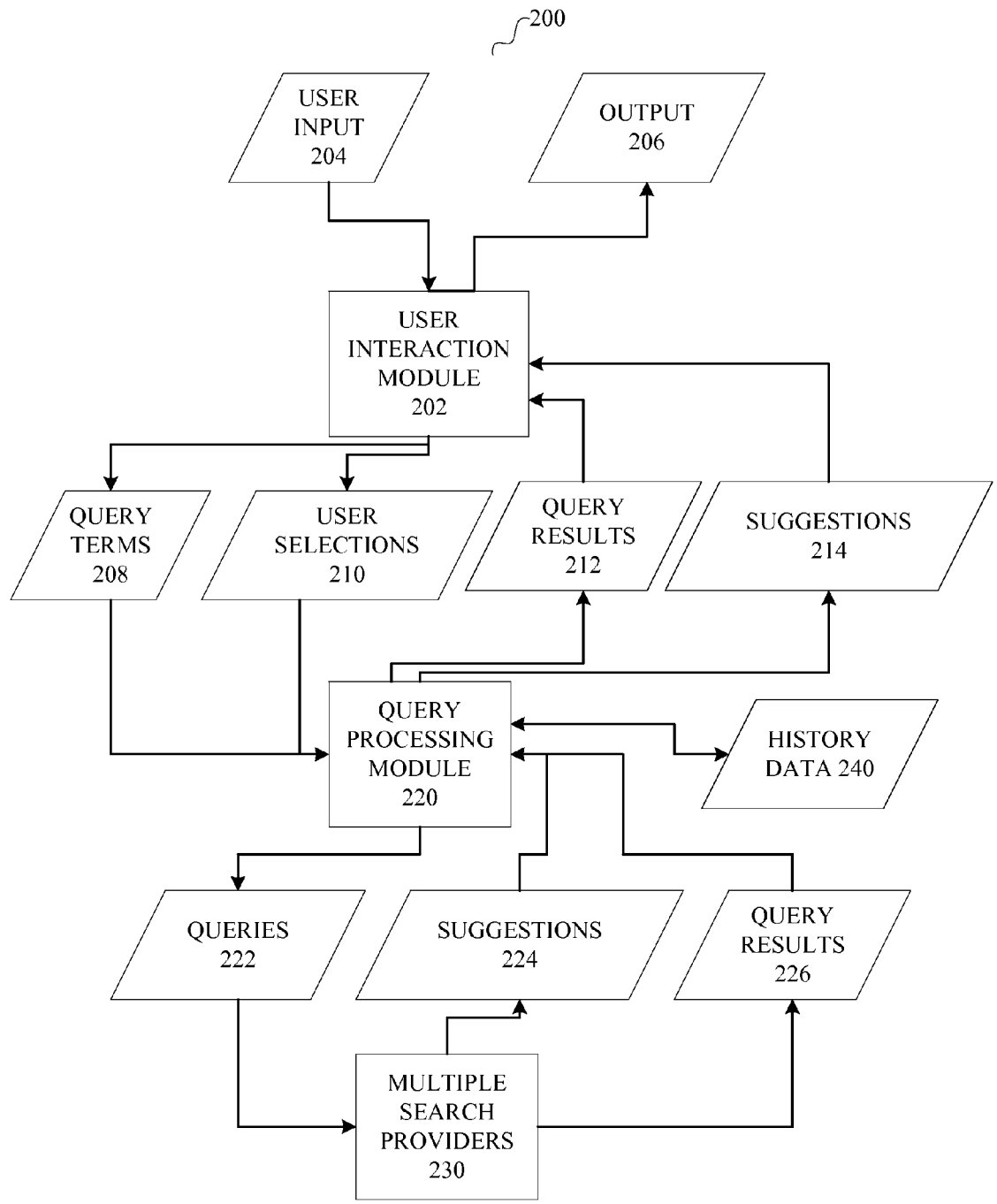
FIG. 2 is a data flow diagram illustrating an example implementation of a search interface that unifies suggestions from multiple search providers.

In FIG. 2, a data flow diagram of a search interface 200 will now be provided. Such a search interface can be implemented on the user's computer or on a remote service accessed through the user's computer over a computer network. In either case, the search interface receives suggestions from other search providers over the computer network, and can receive suggestions from search providers on the same computer as the search interface.

The search interface 200 includes a user interaction module 202 that receives input 204 from and provides output 206 to the user. The user input generally includes alphanumeric characters entered by the user through an input device (not shown) and user selections in response to query suggestions. The output includes data to be displayed or otherwise communicated to the user, such as an interactive display of the user input as the user enters a query and suggestions provided to the user. In turn, the user interaction module 202 provides query terms 208 and user selections 210 to other modules in the system, and receives query results 212 and suggestions 214 from other modules in the system.

A query processing module 220 receives the current query terms 208 and distributes them as queries 222 to multiple search providers 230. Each search provider 230 provides suggestions 224 in reply. Query processing module combines the suggestions 224, in a manner described below, into the suggestions 214 provided to the user. When the user selection 210 indicates that the query is complete, the query processing module sends the search terms 208 to one or more of the multiple search providers 230 as queries, and receives query results 226 in reply, from which query results 212 are provided to the user.

The query processing module also can track queries, suggestions and query results in history data 240. History data can be stored in local storage (not shown) or remote storage (also not shown). In remote storage, such history data can be aggregated for the same user across multiple devices, and with similar history data from other users as well.

Figure 3:
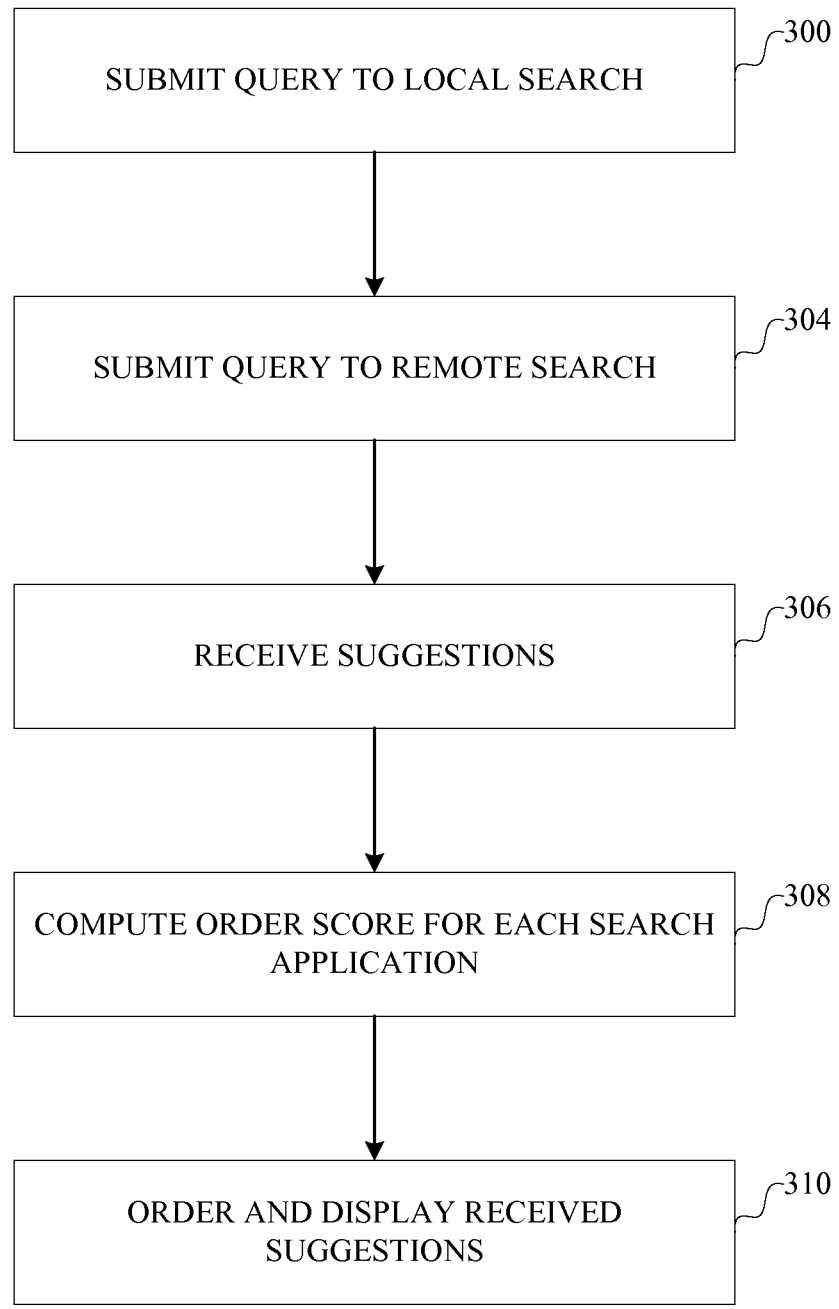
FIG. 3 is a flow chart an example implementation of combining suggestions.

Referring now to FIG. 3, an example implementation of a process for combining suggestion results from multiple sources will now be described.

In this implementation, the combination of suggestions involves ordering suggestions first by ranking the search providers from which the suggestion originate, and then by ranking suggestions within that grouping. Duplicates can be removed. Clearly, other implementations are possible, such as scoring and ranking each suggestion independently of its search provider.

In this example implementation, each search provider is assigned a set of weights to be applied to a set of features for a suggestion for that search provider. There can be an arbitrary set of features for each provider. Thus each provider can have different features, a different number of features and different weightings for those features. In this example, the features for a suggestion are related to the nature of the match between the query terms and the item resulting in the suggestion. For example, a match can be an exact match, a partial match or regular expression match, each of which can be represented by a binary value, e.g., 0 or 1. Thus, any particular suggestion has a related set of features {[0,1], [0,1], [0,1]}, respectively for exact match, regular expression match and partial match, indicating the nature of the match between that suggestion and the query terms. For each search provider, a weight is assigned to each feature in its corresponding set of features.

As an example, for files or other local search, the set of weights can be: {0.8, 0.6, 0.2}, respectively, for exact match, regular expression match and partial match. Thus, the file search facility can return, as a suggestion, a file name that is a partial match, thus having features {0,0,1}, which results in a score for that suggestion of 0.8*0+0.6*0+0.2*1=0.2.

As another example, for the web or other non-local search, a different set of weights can be used, such as: {0.6, 0.4, 0.2}, respectively, for exact match, regular expression match and partial match. Thus, the web search provider can return, as a suggestion, a document that is an exact match, thus having features {1,0,0}, which results in a score for that suggestion of 0.6*1+0.4*0+0.2*0=0.6.

The scores for the suggestions from the search providers can be used as an "order score" by which the search providers are ordered.

If multiple suggestions are provided by a search provider, then an average of a number of these suggestions can be computed and this average can be used as an "order score" for that search provider. Alternatively an order score or weight can be computed for or assigned to the search provider. As noted below, using history data gathered over the computer network related to suggestions, weights can be determined from the web-based data even for local search providers, such as files and settings.

If the order score for a search provider is less than a designated threshold, then the that search provider can be excluded from, hidden or collapsed in the set of suggested presented to the user. A value can be stored for each search provider and the display behavior can be dependent on this value.

This example implementation is reflected in the flow chart shown in FIG. 3. The suggestion engine submits 300 the current query to local search providers, and submits 302 the query to remote search providers. Suggestions from the local applications and remote applications are received 304. For each search provider, an order score is computed 306. Given the order score and the suggestions for each search provider, the suggestion engine orders and displays 308 the received suggestions.

Figure 4:
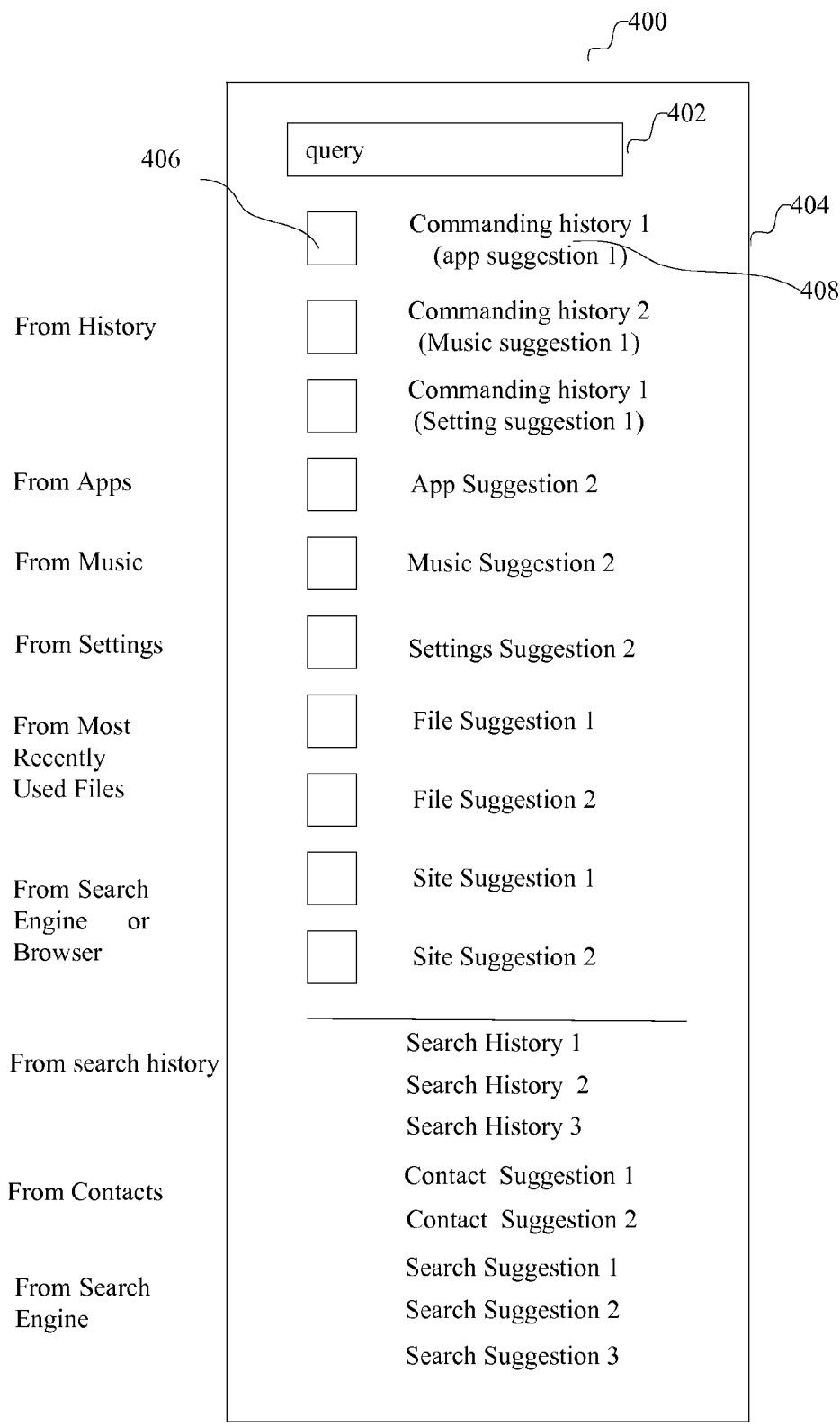
FIG. 4 is an illustration of an example graphical user interface illustrating combined suggestions.

An example graphical user interface 400 for displaying such suggestions is shown in FIG. 4. The interface includes a data entry slot 402 for the user to enter a current query. The current query is interactively displayed as characters, words or phrases are entered by the user. Suggestions are shown below the query at 404. An icon 406 can be used to indicate the type of suggestion. Other data, such as a file name or resource name 408, can be displayed adjacent the icon 406. Different colors or other identifying indicia can be associated with different types of search providers, so that the user can readily distinguish suggestions from different sources.

In the example shown in FIG. 4, a large number of different sources of suggestions are used. In this example, the first items are from a history of local commands. Those are followed by an application suggestion, a music selection, a settings suggestion, file suggestions, web site suggestions, contact suggestions, search history suggestions, and finally search suggestions.

Given the displayed list of suggestions, a user can either continue to enter additional characters, words or phrases, or select from among the suggestions displayed.

The information about the displayed suggestions, and any user selection, can be tracked and later used to provide ways to improve the weighting, scoring or other aspects of the suggestion engine. This information can also be aggregated over multiple users.

Figure 5:
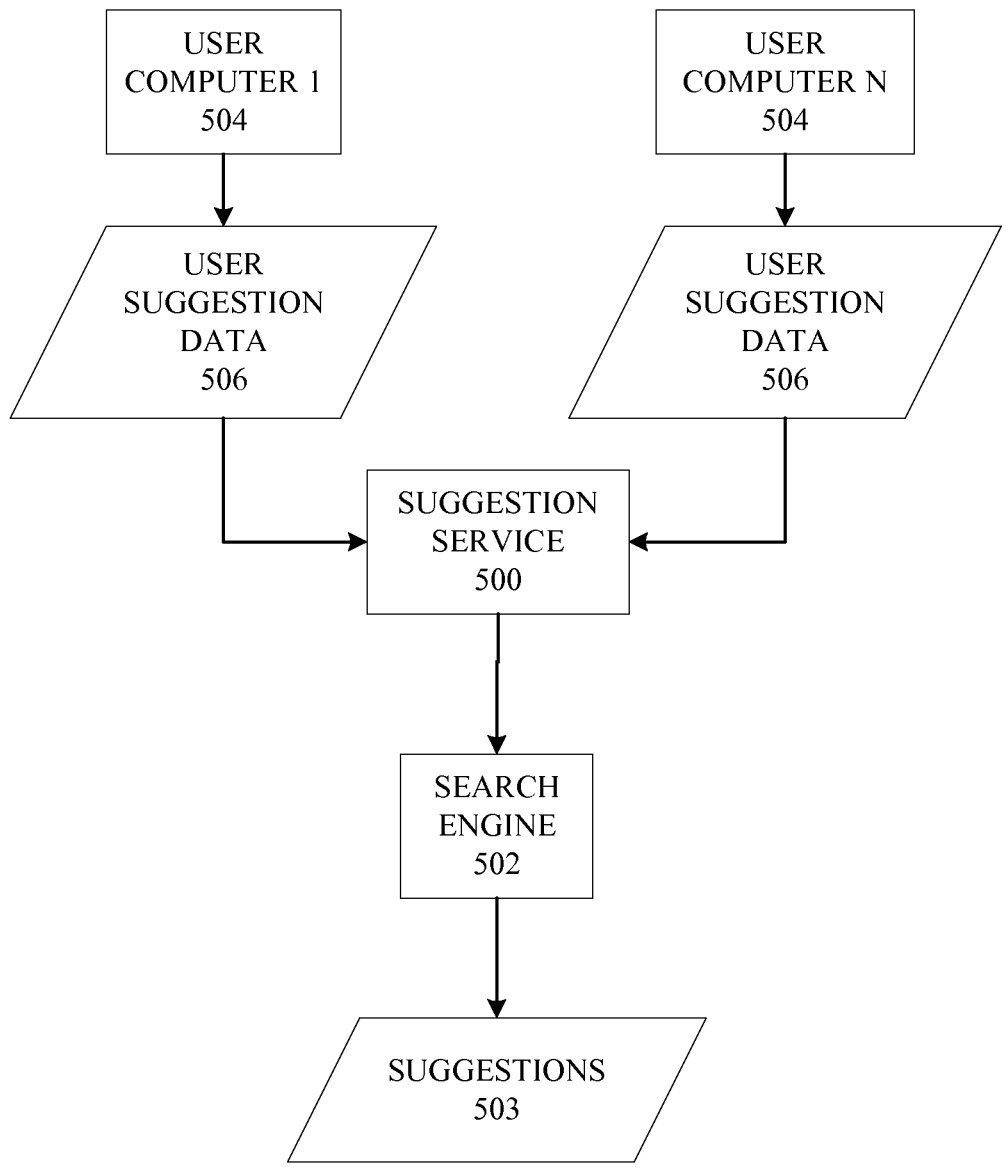
FIG. 5 is a data flow diagram describing an example implementation of a suggestion system.

Referring now to FIG. 5, a dataflow diagram for an example implementation of a centralized system for aggregating such data from multiple users will now be described. Such a system includes what is called herein a "suggestion service" 500. This suggestion service can be used, for example, by a web-based search engine 502, which can be one of the search providers accessed through the search interface of FIGS. 1 and 2 to provide suggestions 503.

The suggestion service is a server computer running a computer program and connected to a computer network (not shown) over which user computers 504 send user suggestion data 506. The user suggestion data can include any suggestions presented to the user, the query that initiated the suggestions, and any selection made by the user from among the suggestions. Locally stored history data can include file names or other specific data about the specific resource accessed by a user after selecting a suggestion. When providing data to the suggestion service, the information provided to the service can include the features and weightings of the suggestions and search providers, and the features, weightings and identity of the search provider. Given the user suggestion data captured by the suggestion service, various analyses can be performed on the data to attempt to improve the suggestions provided by the search engine 502 and/or to improve the weightings or other techniques used to rank suggestions.

In particular, a machine learning algorithm can be used to process the features, weightings and search providers presented to and selected by the user. This information can be processed to optimize a set of weights such that the features and weightings presented to the user tend to place the selected search provider at the top of the list of suggestions presented to the user. In this way, the features and weights determined can be said to result in an ordering of suggestions that is close to what the user might expect. The features and weights determined for each search provider by the suggestion service can be passed to a computer which uses them to aggregate and present suggestions to the user of that computer.

Figure 6:
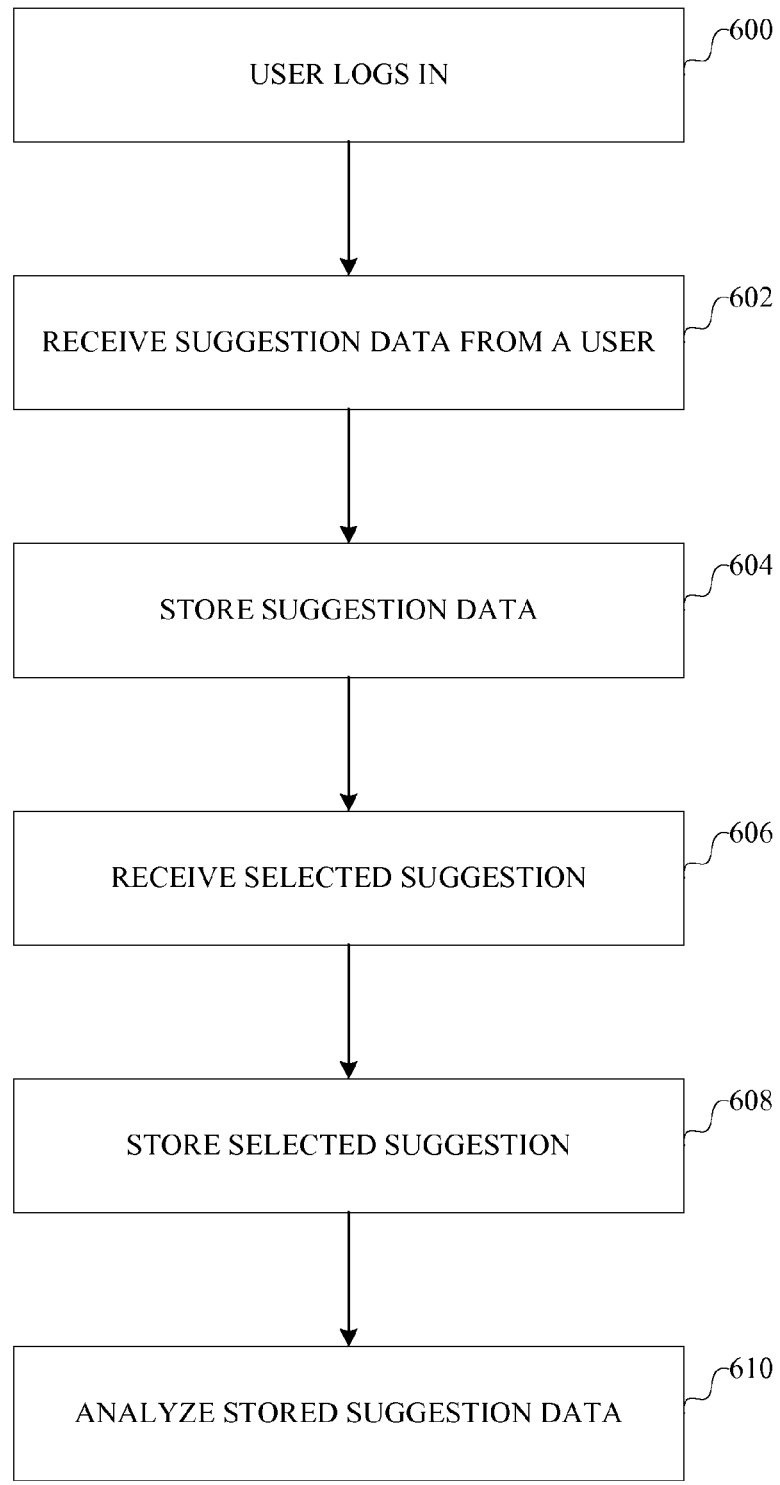
FIG. 6 is a flow chart describing an example implementation of a suggestion system.

Referring now to FIG. 6, a flow chart illustrating an example operation of the system of FIG. 5 will now be described.

For such a service that captures user suggestion data, the service first has the user log in, as noted at 600. Alternatively, data can be collected anonymously across several users. A user then initiates a query and receives suggestions, including suggestions from the search engine associated with the suggestion service. Information about the received suggestions, along with information about their relative ordering when presented to the user, is transmitted to the suggestion service, in response to which the suggestion service receives 602 the suggestion data and stores 604 the suggestion data. In response to a user selecting one of the suggestions, the user computer transmits data about the selected suggestion to the suggestion service, which in turn receives 606 the selection and stores 608 data about the suggestion. The stored data then can be analyzed 610 to improve the suggestion process. Further, the system with the stored data can act as a search provider that provides an aggregate search history across multiple search providers. This search provider can provide suggestions based on a user's history with the search engine, the user's aggregate history over multiple devices and multiple search providers, and/or based on the histories stored for other users determined to be similar to the user, which have a likelihood of being relevant to the user.

Having now described an example implementation, a computer with which components of such a system are designed to operate will now be described. The following description is intended to provide a brief, general description of a suitable computer with which such a system can be implemented. The computer can be any of a variety of general purpose or special purpose computing hardware configurations. Examples of well-known computers that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
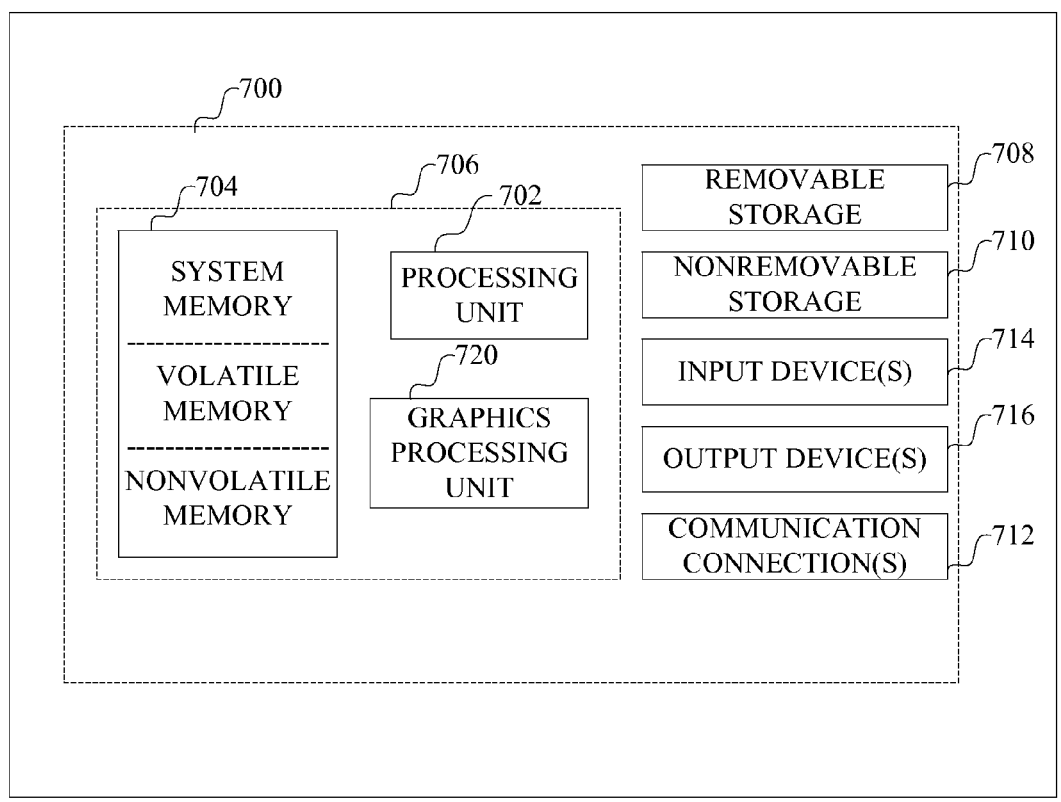
FIG. 7 is a block diagram of an example computing device in which such a system can be implemented.

FIG. 7 illustrates an example of a suitable computer. This is only one example of a suitable computer and is not intended to suggest any limitation as to the scope of use or functionality of such a computer.

With reference to FIG. 7, an example computer 700, in a basic configuration, includes at least one processing unit 706 and memory 704. The computer may include multiple processing units and/or additional co-processing units such as graphics processing unit 720. Depending on the exact configuration and type of computer, memory 704 may be volatile (such as RAM), non-volatile (such as ROM, flash memory, etc.) or some combination of the two. This configuration is illustrated in FIG. 7 by dashed line 706.

Additionally, computer 700 may also have additional features/functionality. For example, computer 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 700. Any such computer storage media may be part of computer 700.

Computer 700 may also contain communications connection(s) 712 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 712 are devices that interface with the communication media to transmit data over and receive data from communication media, such as a network interface.

Computer 700 may have various input device(s) 714 such as a keyboard, mouse, pen, camera, touch input device, and so on. Output device(s) 716 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye , and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system enforces licensing restrictions may be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process performed by a processor in a computer, comprising:
   receiving an initial search query into memory;
   presenting the initial search query to at least two search providers;
   receiving, as suggestions from the at least two search providers into the memory, resource names for items matching the initial search query, wherein the items are identified by and accessible from the computer using the received resource names, wherein at least one of the search providers generates the resource names as the suggestions based on query results including resource names for the items that match the initial search query, the resource names identifying and providing access to the items matching the initial search query;
   computing a score for each of the received suggestions by applying a weighting criterion to each suggestion such that the score is a weighted combination of features, wherein a weight is assigned to each feature, and each feature is related to a nature of a match between the initial search query and the item resulting in the suggestion, wherein each of the at least two search providers is assigned a set of weights to be applied to a set of features for the suggestions for that search provider, and at least a first search provider has different features and different weightings for those features than a second search provider;
   combining the received suggestions into a list in memory according to the scores for the suggestions, including generating an order score for each of the at least two search providers based on the scores for the suggestions, ordering the at least two search providers based on the generated order scores, and presenting the suggestions in groups by search provider wherein the groups are displayed in order according to the ordering of the at least two search providers, and ranking the suggestions within each group by the scores for the suggestions, and wherein the suggestions within each group are displayed in order according to the ranking;
   presenting the list of combined suggestions on a display; and
   in response to a selection from a user of one of the presented suggestions in the presented list, wherein the presented suggestion comprises a resource matching the initial query, accessing the resource corresponding to the resource name of the selected suggestion presented in the list;
   wherein at least one of the search providers is a file system of a computer, and wherein the resource names received as suggestions from the file system include file names of files matching the initial search query.

2. The computer-implemented process of claim 1, wherein the search providers include a search tool for a file system of an operating system on the computer and a search engine accessed by the computer over a computer network.

3. The computer-implemented process of claim 1, wherein at least one of the search providers generates suggestions based on an aggregated history of prior queries submitted to multiple search providers.

4. The computer-implemented process of claim 1, wherein the suggestions and any selection from among the suggestions is stored on the computer.

5. The computer-implemented process of claim 1, wherein the suggestions and any selection from among the suggestions are transmitted to a computer over a computer network for aggregation and storage with like data from other computers connected to the computer network.

6. An article of manufacture comprising:
   a memory device or a storage device;
   computer program instructions stored on the memory device or the storage device which, when processed by a processing device, instruct the processing device to perform a process comprising:
   receiving an initial search query into memory;
   presenting the initial search query to at least two search providers;
   receiving, as suggestions from the at least two search providers into the memory, resource names for items matching the initial search query, wherein the items are identified by and accessible from the computer using the received resource names, wherein at least one of the search providers generates the resource names as the suggestions based on query results including the resource names for the items that match the initial search query, the resource names identifying and providing access to the items matching the initial search query;
   computing a score for each of the received suggestions by applying a weighting criterion to each suggestion such that the score is a weighted combination of features, wherein a weight is assigned to each feature, and each feature is related to a nature of a match between the initial search query and the item resulting in the suggestion, wherein each of the at least two search providers is assigned a set of weights to be applied to a set of features for the suggestions for that search provider, and at least a first search provider has different features and different weightings for those features than a second search provider;

combining the received suggestions into a list in memory according to the scores for the suggestions, including generating an order score for each of the at least two search providers based on the scores for the suggestions, ordering the at least two search providers based on the generated order scores, and presenting the suggestions in groups by search provider wherein the groups are displayed in order according to the ordering of the at least two search providers, and ranking the suggestions within each group by the scores for the suggestions, and wherein the suggestions within each group are displayed in order according to the ranking;

presenting the list of combined suggestions on a display; and in response to a selection from a user of one of the presented suggestions in the presented list, wherein the presented suggestion comprises a resource matching the initial query, accessing the resource corresponding to the resource name of the selected suggestion presented in the list;

wherein at least one of the search providers is a file system of a computer, and wherein the resource names received as suggestions from the file system include file names of files matching the initial search query.

7. The article of manufacture of claim 6, wherein combining comprises removing duplicate suggestions.

8. The article of manufacture of claim 6, wherein the search providers include a search tool for a file system of an operating system on the computer and a search engine accessed by the computer over a computer network.

9. The article of manufacture of claim 6, wherein at least one of the search providers generates suggestions based on a history of prior queries submitted to the search provider.

10. The article of manufacture of claim 6, wherein the suggestions and any selection from among the suggestions is stored on the computer.

11. The article of manufacture of claim 6, wherein the suggestions and any selection from among the suggestions are transmitted to a computer over a computer network for aggregation and storage with like data from other computers connected to the computer network.

12. A computer comprising:
a memory,
a processor connected to the memory and programmed to:
receive an initial search query into memory;
present the initial search query to at least two search providers;
receive, as suggestions from the at least two search providers into the memory, resource names for items matching the initial search query, wherein the items are identified by and accessible from the computer using the received resource names, wherein at least one of the search providers generates the resource names as the suggestions based on query results including resource names for the items that match the initial search query, the resource names identifying and providing access to the items matching the initial search query;

compute a score for each of the received suggestions by applying a weighting criterion to each suggestion such that the score is a weighted combination of features, wherein a weight is assigned to each feature, and each feature is related to a nature of a match between the initial search query and the item resulting in the suggestion, wherein each of the at least two search providers is assigned a set of weights to be applied to a set of features for the suggestions for that search provider, and at least a first search provider has different features and different weightings for those features than a second search provider;

combine the received suggestions into a list in memory according to the scores for the suggestions, including generate an order score for each of the at least two search providers based on the scores for the suggestions, ordering the at least two search providers based on the generated order scores, and present the suggestions in groups by search provider wherein the groups are displayed in order according to the ordering of the at least two search providers, and ranking the suggestions within each group by the scores for the suggestions, and wherein the suggestions within each group are displayed in order according to the ranking;

present the list of combined suggestions on a display; and in response to a selection from a user of one of the presented suggestions in the presented list, wherein the presented suggestion comprises a resource matching the initial query, access the resource corresponding to the resource name of the selected suggestion presented in the list;

wherein at least one of the search providers is a file system of a computer, and wherein the resource names received as suggestions from the file system include file names of files matching the initial search query.

13. The computer of claim 12, wherein the search providers include a search tool for a file system of an operating system on the computer and a search engine accessed by the computer over a computer network.

14. The computer of claim 12, wherein at least one of the search providers generates suggestions based on a history of prior queries submitted to the search provider.

15. The computer of claim 12, wherein the suggestions and any selection from among the suggestions is stored on the computer.

16. The computer of claim 12, wherein the at least one of the search providers generates suggestions based on a history of prior queries submitted to the search provider by other users similar to the user providing the initial search query.

* * * * *